United States Patent [19]

Toyoda

[11] Patent Number: 5,040,505
[45] Date of Patent: Aug. 20, 1991

[54] INTAKING RATE CONTROL DEVICE OF INTERNAL COMBUSTION ENGINE

[75] Inventor: Katsuhiko Toyoda, Shizuoka, Japan

[73] Assignee: Suzuki Motor Corporation, Shizuoka, Japan

[21] Appl. No.: 619,304

[22] Filed: Nov. 28, 1990

[30] Foreign Application Priority Data

Dec. 8, 1989 [JP] Japan .................. 1-319424

[51] Int. Cl.$^5$ .................. F02M 23/10; F02M 23/06
[52] U.S. Cl. .................. 123/327; 123/588
[58] Field of Search .................. 123/327, 339, 585, 588, 123/493

[56] References Cited

U.S. PATENT DOCUMENTS

| | | | |
|---|---|---|---|
| 4,194,477 | 3/1980 | Sugiyama | 123/327 |
| 4,359,993 | 11/1982 | Carlson | 123/327 X |
| 4,438,744 | 3/1984 | Hasegawa | 123/327 |
| 4,465,043 | 8/1984 | Denz et al. | 123/327 |
| 4,672,936 | 6/1987 | Abe | 123/588 X |
| 4,700,674 | 10/1987 | Iwata | 123/327 |
| 4,886,035 | 12/1989 | Tomobe et al. | 123/588 |

FOREIGN PATENT DOCUMENTS

| | | | |
|---|---|---|---|
| 0200364 | 9/1986 | Japan | 123/327 |
| 0085160 | 4/1987 | Japan | 123/327 |
| 63-68738 | 3/1988 | Japan . | |
| 63-208638 | 8/1988 | Japan . | |

*Primary Examiner*—Willis R. Wolfe
*Attorney, Agent, or Firm*—Flynn, Thiel, Boutell & Tanis

[57] ABSTRACT

A method and apparatus for controlling the air intake rate of an internal combustion engine, which internal combustion engine includes a deceleration control system responsive to actuation of an idle switch during deceleration for bypassing an intake throttle valve and feeding bypass air into the engine. The control device actuates the deceleration control system only when (1) the cooling water temperature of the engine is greater than or equal to a predetermined water temperature, (2) the engine is decelerating, (3) the engine speed is less than or equal to an actuation speed associated with the deceleration control system, and (4) the engine speed is changing at a rate which is greater than or equal to an actuation differential change rate associated with the deceleration control system. The control device applies to the deceleration control system a control signal having a duty ratio which corresponds to the change rate of the engine speed and which increases the rate at which bypass air is taken into the engine.

2 Claims, 5 Drawing Sheets

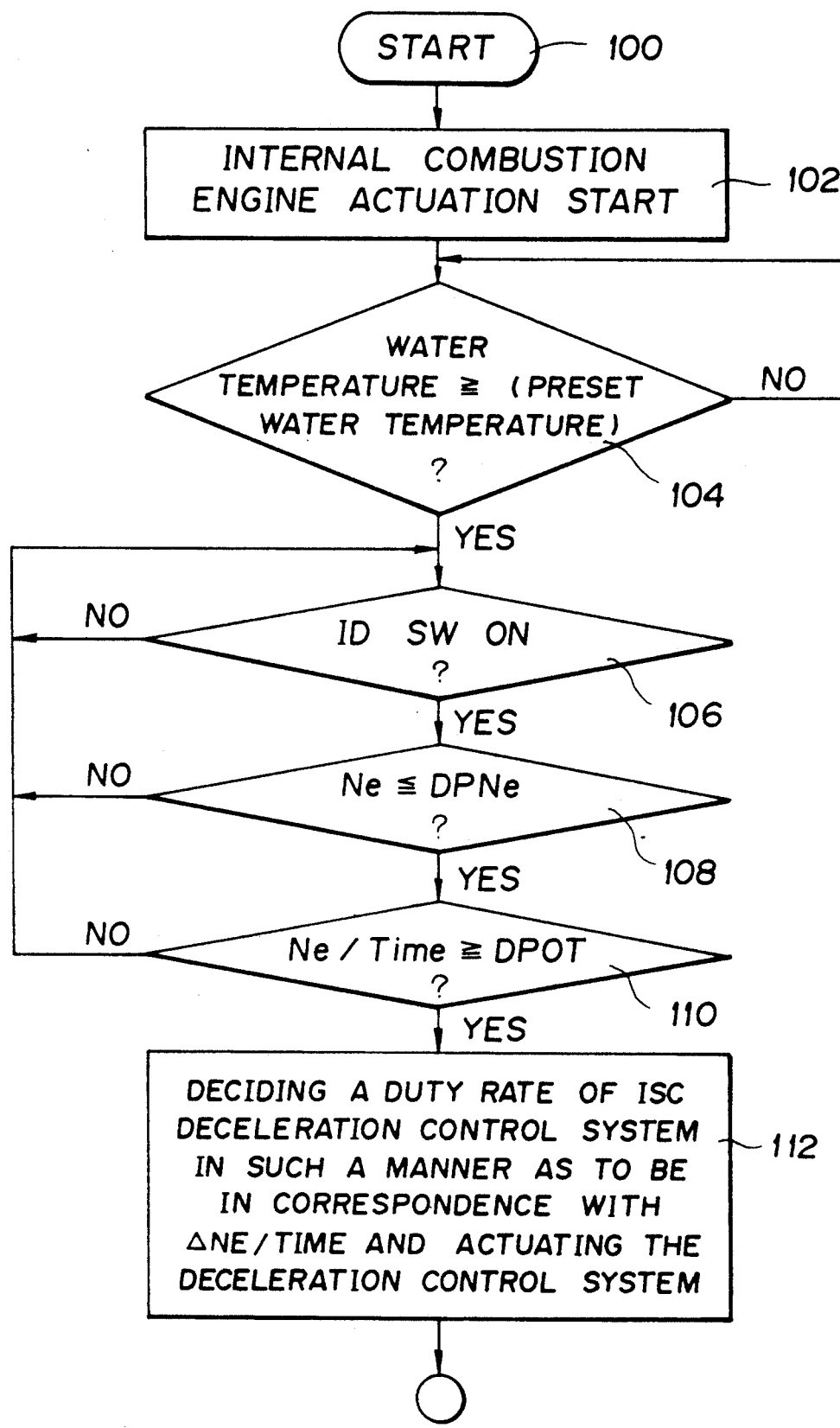

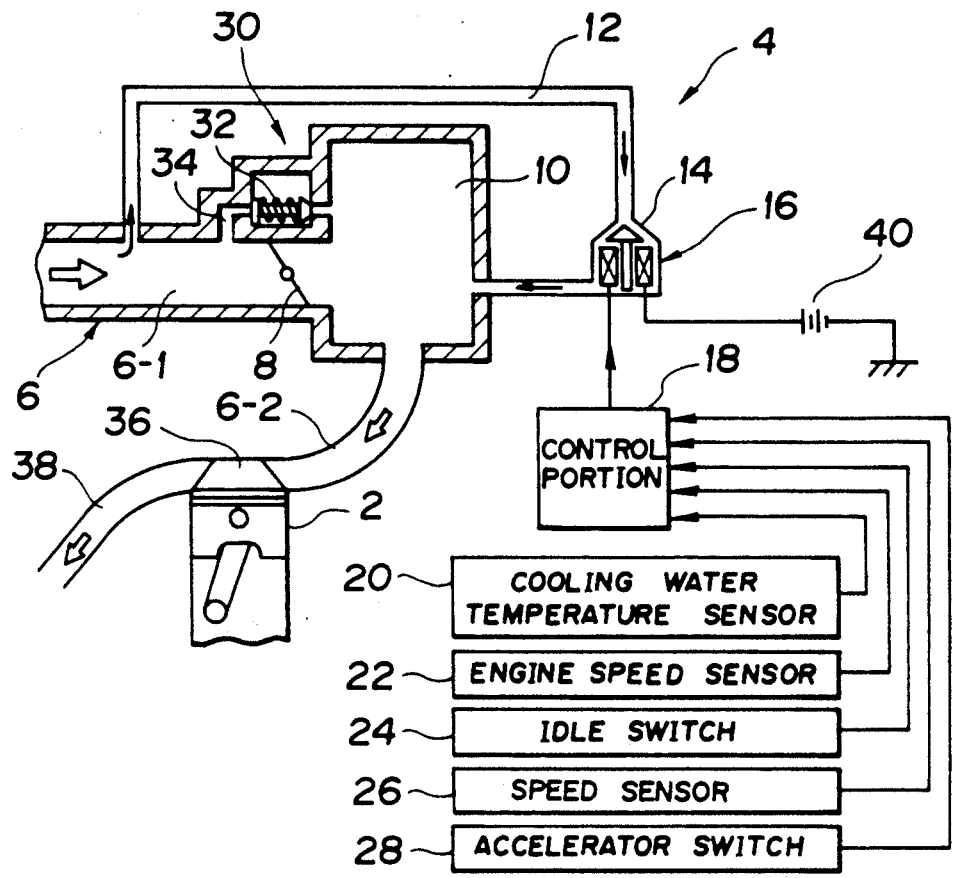

FIG.4
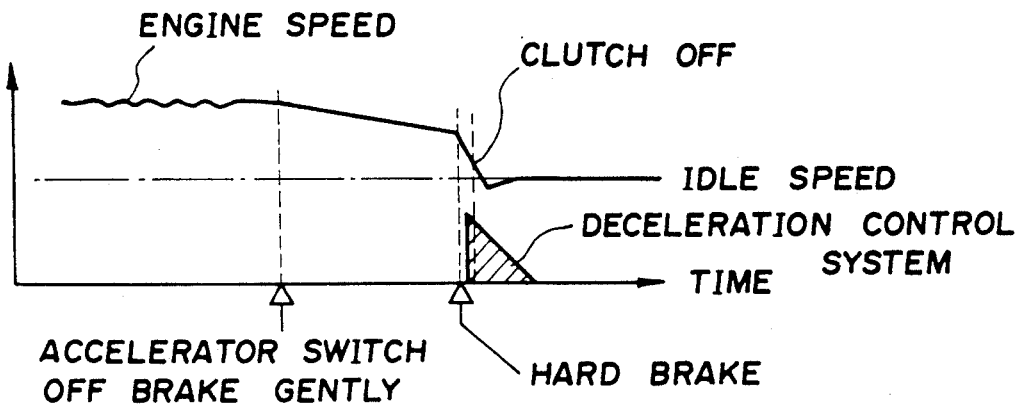
FIG.5
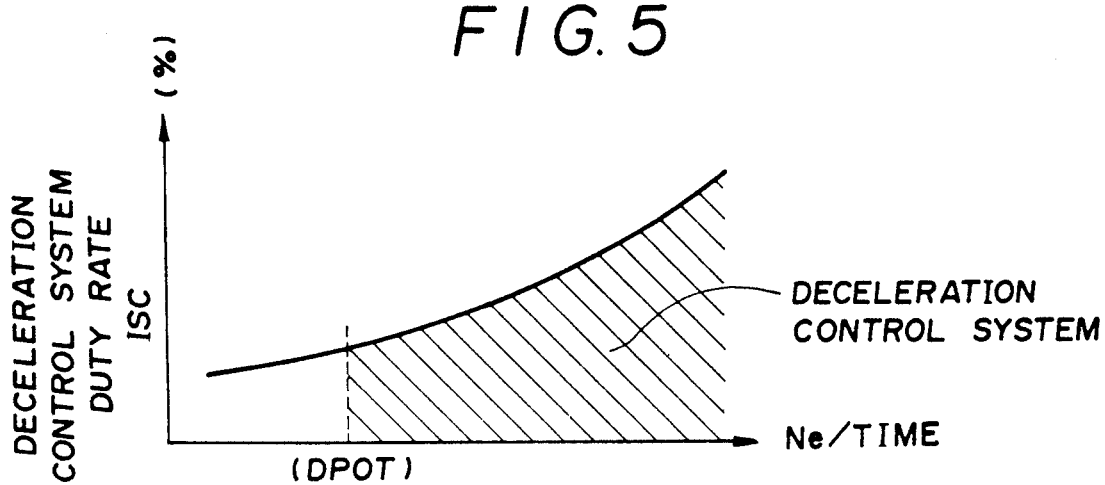
FIG.6 PRIOR ART
| ENGINE COOLING WATER | -30°C | -20°C | -10°C | --- |
|---|---|---|---|---|
| TARGET ENGINE SPEED | rpm 2000 | rpm 1800 | rpm 1600 | --- |

INTAKING RATE CONTROL DEVICE OF INTERNAL COMBUSTION ENGINE

FIELD OF THE INVENTION

This invention relates to an air intake rate control device of an internal combustion engine, and particularly to an air intake rate control device for controlling air intaking rate in such manner as to control the engine speed so that it corresponds to the temperature of cooling water of the engine and to feed bypass air into the internal combustion engine bypassing the throttle valve during deceleration.

BACKGROUND OF THE INVENTION

There is known an air intake rate control device for electrically controlling the opening and closing operation of a control valve placed in a bypass passageway bypassing an intake throttle valve by means of idle speed control (ISC) and controlling the air intake rate to the engine by regulating the bypass air rate passing through the bypass passageway, thereby to control the engine speed when the engine is idling.

The idle speed control (ISC), as shown in FIG. 6, drives the control valve to obtain a target engine speed corresponding to the cooling water temperature of the engine, and feedback controls the engine speed.

As is shown in FIG. 7, this feedback control determines whether both a first condition requiring an idle switch to be in its active (ON) state and a second condition requiring the engine speed to be lower than a target engine speed are satisfied. If the idle switch has been in its active state for a delay time, or if both of the aforementioned first and second conditions are satisfied, and if a further condition requiring the vehicle speed to be lower than a comparable vehicle speed at the start of control, and a still further condition requiring the engine speed to be lower than a comparable engine speed at the start of control as shown in FIG. 8 are also satisfied, then the feedback control is started.

In case the conditions required for starting the feedback control are not satisfied, an ISC duty rate of the control valve is maintained fixed and a fixed control is performed.

Furthermore, when in deceleration, the deceleration control system as a dash pot portion is actuated upon actuation of the idle switch and the air intaking rate is increased to prevent a decrease of engine speed and engine stall (see FIGS. 9(a) and 9(b)).

As is shown in FIG. 10, actuation of the prior art deceleration control system is triggered if both a first condition requiring the engine speed to be equal to or lower than a fuel cut engine speed and a second condition requiring the idle switch to be in its active (ON) state are satisfied, or if a third condition wherein the driving state has recovered from fuel cut is satisfied.

Also, as shown in FIG. 11, for triggering the start of the fuel cut control of FIGS. 9a and 9b is to satisfy either a first condition wherein the engine speed is 4000 rpm or more and the idle switch is in its active (ON) state, or a second condition wherein the engine speed is equal to or more than the fuel cut engine speed but less than 4000 rpm and the idle switch is in its active (ON) state.

One example of a conventional air intake rate control device is disclosed in Japanese Patent Early Laid-open Publication No. Sho 63-68738. The air intake rate control device disclosed in this Publication is constructed such that in an intake rate control device for feeding air into an intake passageway on the downstream side of a throttle valve when the engine is being decelerated, a reducing rate per unit time of the deceleration air is varied by control means in accordance with the driving state of the engine. For example, when the engine speed is high in an early stage of deceleration, the reducing rate is increased to provide a decelerating feeling and the reducing rate is decreased in accordance with the lowering of the engine speed as it comes close to a later stage of deceleration, in order to prevent deceleration shock.

Japanese Patent Early Laid-open Publication No. Sho 63-208638 discloses another known control device which comprises bypass air control means for feeding a predetermined quantity of bypass air which is to be gradually reduced when the engine is decelerating, fuel cut means for cutting fuel at deceleration, and air rate detection means for detecting the bypass air flow rate. The air rate detection means is set such that the fuel cut operation is performed for deceleration when the bypass air flow rate becomes less than a predetermined quantity, thereby to prevent generation of hatching and to improve driving performance.

In the conventional intake rate control device, the deceleration control system is actuated every time the fuel cut operation is performed. Therefore, when the temperature of the engine cooling water is low, the engine speed is increased by the air rate resulting from actuation of the deceleration control system and by the air rate coming from an air regulator, thus generating an awkward feeling of physical disorder and deteriorating the driving performance. Also, when the changing operation of a shift lever is effected and ON/OFF operation of an accelerator switch for detecting the amount of depression of the accelerator is effected, the deceleration control system is actuated to increase the intake rate more than necessary as shown by the hatched area of FIG. 12, thus again generating an awkward feeling of physical disorder while driving and deteriorating the driving performance.

Furthermore, when the idle switch is brought to its inactive (OFF) state from its active (ON) state, the deceleration control system is actuated, and when a hard braking is effected or the clutch discs are disconnected after the passage of a short time from when the accelerator switch is turned OFF, the deceleration control system is not actuated and the engine speed is lowered, and finally engine stall results.

Therefore, the object of the present invention is, for the purpose of obviating the above inconveniences, to provide an air intake rate control device of an internal combustion engine which includes control means for actuating said deceleration control system only when it satisfies the conditions that the cooling water temperature of the engine is equal to a preset water temperature or higher, than an accelerator switch is in its inactive state and therefore the engine is decelerating, that said engine speed is equal to or lower than the actuation speed of said deceleration control system, and that the reductive change rate of engine speed is equal to or larger than an actuation differential change rate of said deceleration control system, the control means deciding a duty rate of said deceleration control system in such a manner as to be in correspondence with the reductive change rate of the engine speed, and increasing the air intake rate, whereby unnecessary actuation of the deceleration control system is prevented, driving performance is enhanced, the duty rate of the deceleration control system can be decided in such a manner as to be in correspondence with a reductive change rate of engine speed, and decreases in engine speed and subsequent engine stall can be prevented by properly increasing the air intaking rate.

In order to achieve the above, according to the present invention, in an air intaking rate control device of an internal combustion engine for controlling an air intaking rate in such a manner as to control the engine speed so that it corresponds to the temperature of cooling water of the engine and to actuate a deceleration control system for feeding bypass air into said internal combustion engine bypassing an intake throttle valve upon actuation of an idle switch at deceleration, said air intaking rate control device includes control means for actuating said deceleration control system only when it satisfies the conditions that (1) said temperature of cooling water of said engine is equal to or higher than a preset water temperature, (2) an accelerator switch is in its inactive state and the engine is decelerating, (3) said engine speed is equal to or lower than the actuation speed of said deceleration control system, and (4) said reductive change rate of engine speed per unit time is equal to or larger than an actuation differential change rate of said deceleration control system. A duty rate of a control signal applied to said deceleration control system is decided in such a manner as to be in correspondence with a reductive change rate of engine speed. The air intaking rate is controlled to be increased by the control means, unnecessary actuation of the deceleration control system is prevented, driving performance is enhanced, and lowering of the engine speed and subsequent engine stall are prevented by properly increasing the air intaking rate.

BRIEF DESCRIPTION OF THE DRAWINGS

The embodiment of the present invention will be described in detail with reference to the drawings, in which:

FIG. 1 is a flowchart which illustrates the procedure according to the present invention for controlling the air intake rate of an air intake rate control device of an internal combustion engine;

FIG. 2 is a schematic view of an embodiment of the air intake rate control device according to the present invention;

FIG. 3 is a logic diagram showing the conditions for triggering the actuation of the idle speed control (ISC) deceleration control system according to the present invention;

FIG. 4 is a time chart showing the engine speed when decelerating with the present invention;

FIG. 5 is a graphical diagram showing a relation between a duty rate of the ISC deceleration control system and a reductive change rate Δ Ne/Time of the engine speed;

FIG. 6 is a table showing the relation between engine cooling water temperature and target engine speed in a prior art device;

DETAILED DESCRIPTION

Figure 7:
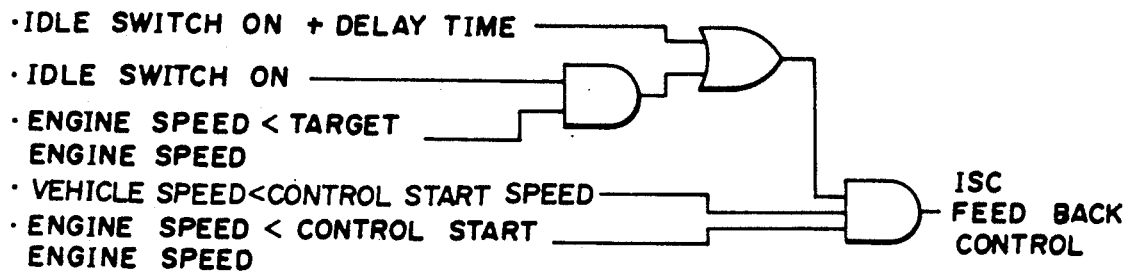
FIG. 7 is a logic diagram showing the conditions for triggering the ISC feedback control in a prior art device.
Figure 8:
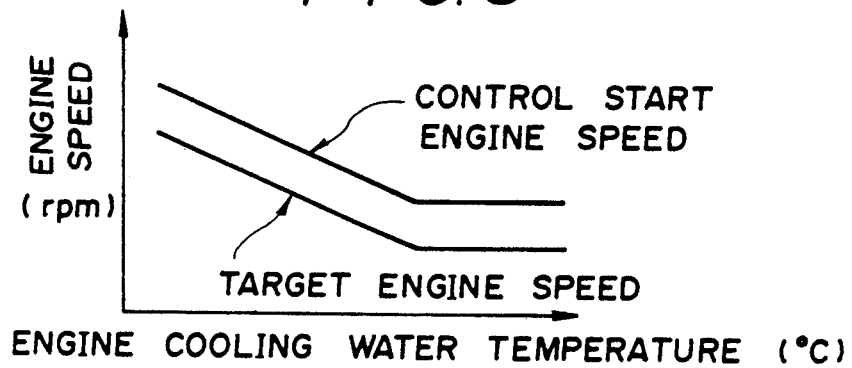
FIG. 8 is a graphical diagram showing a control start engine speed and a target engine speed of a prior art device plotted against the engine cooling water temperature.
Figure 9A:
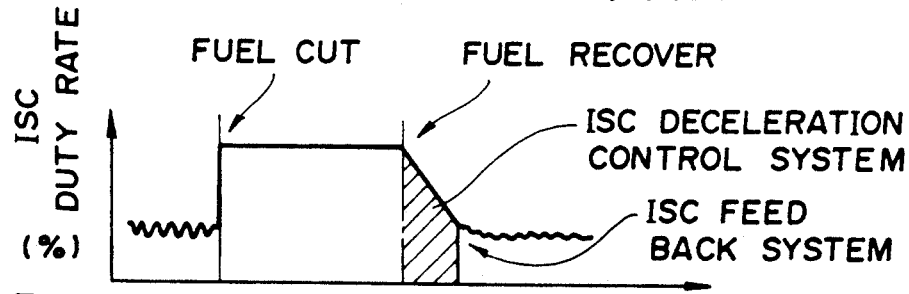
FIG. 9(a) is a graphical diagram showing the relationship between ISC duty rate and time in a prior art device.
Figure 9B:
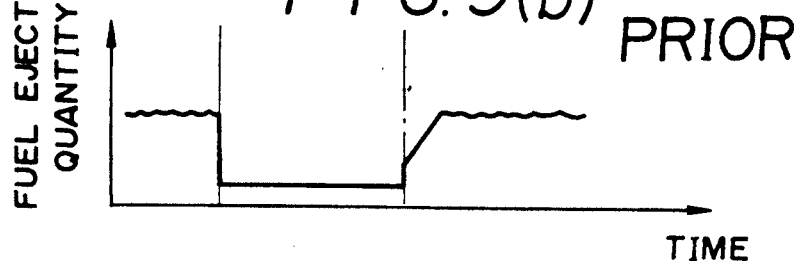
FIG. 9(b) is a graphical diagram showing the relationship between fuel ejection quantity and time in a prior art device.
Figure 10:
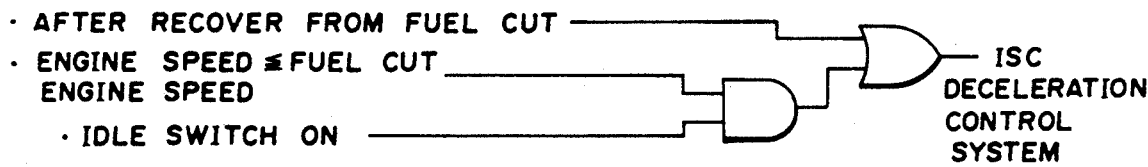
FIG. 10 is a logic diagram showing the conditions for triggering the actuation of a prior art ISC deceleration control system.
Figure 11:
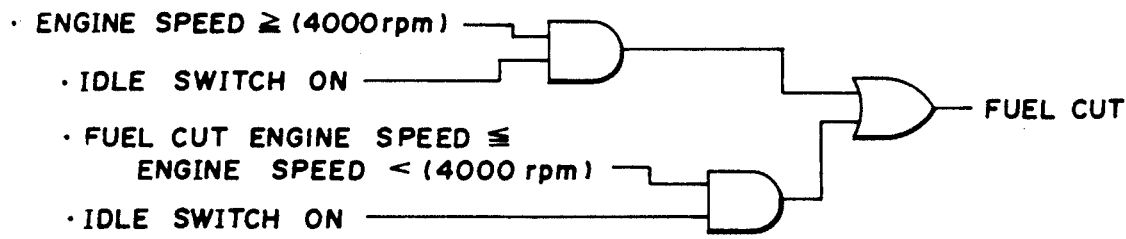
FIG. 11 is a logic diagram showing the conditions for triggering a fuel cut operation in a prior art device.
Figure 12:
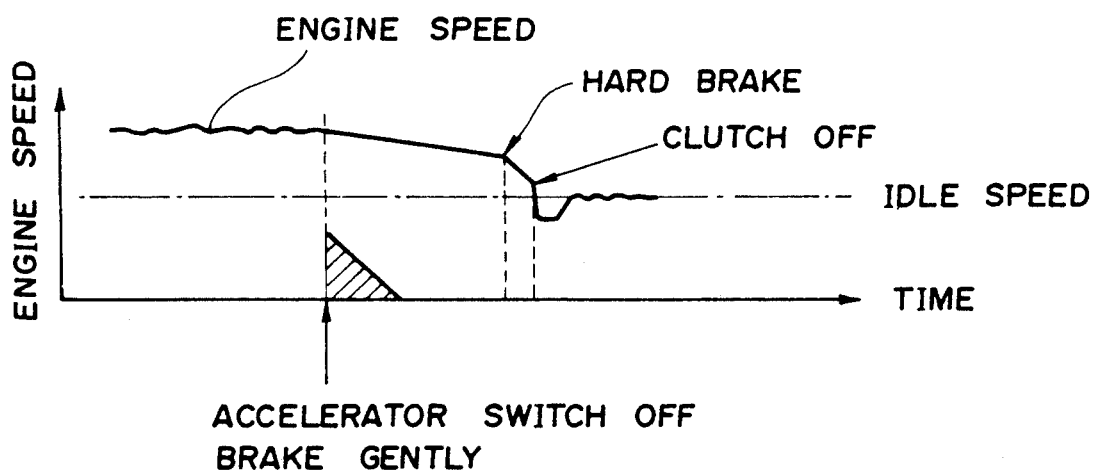
FIG. 12 is a timing diagram showing the engine speed when decelerating with a prior art device.

FIGS. 1 through 5 show a preferred embodiment of the present invention. In FIG. 2, the numeral 2 denotes an internal combustion engine, and 4 an intake rate control device of the internal combustion engine 2.

This intake rate control device 4 includes a bypass intake passageway 12 adapted to intercommunicate an intake passageway 6-1 disposed on the upstream side of an intake throttle valve 8 placed in an intake passageway 6 of the internal combustion engine 2 and a surge tank 10 disposed on the downstream side of the intake throttle valve 8, thereby bypassing the intake throttle valve 8. This bypass intake passageway 12 is provided with a control valve 14 operated by duty rate and adapted to control a bypass intake rate. By this control valve 14, a bypass air intake rate passing through the bypass intake passageway 12 is regulated and the engine speed is controlled by feedback so that it becomes a target speed.

This control valve 14 acts as a so-called deceleration control system 16, which is placed in the bypass intake passageway 12 bypassing the intake throttle valve 8. The opening and closing operation of the control valve 14 is electrically controlled by idle speed control (ISC). More specifically, the control valve 14 is controlled by an electrical control signal having a selected duty ratio (or duty rate). The bypass air rate passing through the bypass intake passageway 12 is regulated by the control valve 14 to control an air intake rate to the internal combustion engine 12. Therefore the engine speed of the internal combustion engine 2 is controlled when the engine is decelerating. The control valve 14 is connected to a control portion 18 as control means. This control portion 18 may preferably be implemented using a conventional microprocessor circuit, as will be evident from the following description.

The control portion 18 is connected with a cooling water temperature sensor 20 for detecting the engine cooling water temperature of the internal combustion engine 2, an engine speed sensor 22 for detecting engine speed, an idle switch 24 which is switched ON when the opening degree of the intake throttle valve 8 is an idle opening degree and switched OFF when it exceeds the idle opening degree, a speed sensor 26 for detecting vehicle speed, and an accelerator switch 28 for detecting the amount of depression of an accelerator (not shown) and which assumes its inactive (OFF) state when the engine is decelerated.

Owing to the foregoing arrangement, the intake rate control device 4 controls the engine speed such that the engine speed becomes a preset target speed in accordance with the cooling water temperature.

The control portion 18 of the intake rate control device 4 actuates the deceleration control system 16 only when the following conditions are satisfied: (1) the engine cooling water temperature measured by the cooling water temperature sensor 20 is equal to or higher than a predetermined water temperature; (2) the accelerator switch 28 is in its inactive (OFF) state and therefore the engine is decelerating; (3) the engine speed is equal to or lower than the actuation speed of the deceleration control system 16; and (4) the reductive change rate of engine speed is equal to or larger than an actuation differential change rate of the deceleration control system 16. If the foregoing conditions are satisfied, then the control portion 18 decides the duty rate of the control signal applied to the deceleration control system 16 such that the duty rate corresponds to the reductive change rate of engine speed and increases the air intake rate.

Specifically, the control portion 18, as shown in FIG. 3, actuates the deceleration control system 16 only when all of the illustrated conditions are satisfied, as discussed below.

The engine cooling water temperature measured by the cooling water temperature sensor 20 must be equal to or higher than the predetermined water temperature. That is, Eng. cooling water temp $\geq$ Present water temp.

The accelerator switch 28 must be in its inactive (OFF) state such that the engine is decelerating, e.g. the idle switch 24 is in its active (ON) state. That is,

ID SW=ON.

The engine speed Ne must be equal to or lower than the actuation speed DPNe of the deceleration control system. That is, NE$\leq$DPNe.

The differential change $\Delta$Ne of the engine speed must be negative such that the engine is decelerating. That is, $\Delta$Ne<0.

The reductive change rate $\Delta$Ne/Time of enqine speed, as shown in FIG. 5, must be equal to or larger than the actuation differential change rate DPOT of the deceleration control system 16. That is, $\Delta$Ne/Time$\geq$DPOT.

When the deceleration control system 16 is actuated, the control portion 18, as shown in FIG. 5, decides the control signal duty rate (%) of the deceleration control system 16 in such a manner as to be in correspondence with the reductive change rate $\Delta$Ne/Time of engine speed and increases the air intake rate.

In other words, as is shown in FIG. 5, when the reductive change rate $\Delta$Ne/Time of the engine speed is smaller than the actuation differential change rate DPOT of the deceleration control system 16, the control portion 18 prevents the actuation of the deceleration control system 16, and when the reductive change rate $\Delta$Ne/Time of the engine speed is equal to or larger than the actuation differential change rate DPOT of the deceleration control system 16, the control portion 18 changes the duty rate (%) of the control signal applied to the deceleration control system 16 such that it corresponds to the reductive change rate $\Delta$Ne/Time of the engine speed.

In FIG. 2, the reference numeral 30 denotes an air regulator. The air regulator 30 opens and closes an air passageway 34 bypassing the intake throttle valve 8 by an air valve 32, which is activated by utilizing the displacement of a thermo-sensitive element such as thermo-wax, etc., in correspondence with the temperature of cooling water. This corrects the air intake rate to an intake passageway 6-2 disposed on the downstream side of the intake throttle valve 8 when the temperature is low. Furthermore, the reference numeral 36 denotes a combustion chamber, 38 a discharge passageway, and 40 a battery.

The operation will now be described with reference to the flowchart of FIG. 1, which illustrates the control of the air intake rate by the intake rate control device 4 of the internal combustion engine 2.

Upon starting actuation of the internal combustion engine 2, for example, upon insertion of an ignition key, an intake rate control program is started at 100.

After the actuation of the internal combustion engine 2 starts at 102, the cooling water temperature sensor 20 determines at 104 whether the engine cooling water temperature is equal to or higher than a preset water temperature, Eng. cooling water temp. $\geq$ Preset water temp.

If the decision at 104 is NO, this step 104 is repeated until the engine cooling water temperature becomes equal to or higher than the preset water temperature. If the decision at 104 is YES, a determination is made at 106 as to whether the accelerator switch 28 is in its inactive (OFF) state (and therefore the engine is decelerating), i.e. whether the idle switch 24 is in its ON position,

ID SW=ON.

If the decision at 106 is NO, this step 106 is repeated until the idle switch 24 is brought to its active state (or ON position). If the decision at 106 becomes YES, a determination is made at 108 as to whether the engine speed Ne is equal to or lower than the actuation speed DPNe of the deceleration control system 16, Ne$\leq$DPNe.

If the decision at 108 is NO, then the determination at 106 as to whether the idle switch 24 is in its active state (or ON position) is repeated. If the decision at 108 is YES, a determination is made at 110 as to whether the reductive change rate $\Delta$Ne/Time of the engine speed is equal to or higher than the actuation differential change rate DPOT of the deceleration control system 16, $\Delta$Ne/Time$\geq$DPOT.

If the decision at 110 is NO, then the determination at 106 as to whether the idle switch 24 is in its active state (or ON position) is repeated. If the decision at 110 is YES, the deceleration control system 16 is actuated, and the control signal duty rate (%) of the deceleration control system 16 is decided in such a manner as to be in correspondence with the reductive change rate $\Delta$Ne/Time of the engine speed, and the deceleration control system 16 is actuated at 112 by the control portion 18 in order to increase the air intake rate.

By this, unnecessary actuation of the deceleration control system 16 can be prevented, and the fuel efficiency can be improved and is thus economically advantageous.

Also, by inhibiting actuation of the deceleration control system 16 when the engine cooling water temperature is lower than the preset water temperature, the air intake rate is not increased, the awkward feeling of physical disorder is not generated when driving, and the driving performance can be enhanced.

Furthermore, by inhibiting actuation of the deceleration control system 16 of vehicles having either an automatic or a manual transmission, particularly when the engine is decelerating and the engine cooling water temperature is low, the traveling of the car is prevented by the deceleration control system 16 and safety can be enhanced.

Moreover, as is shown in FIG. 4, by inhibiting actuation of the deceleration control system 16 when the shift lever is changed and/or when the accelerator switch 28 is switched on or off, the intake rate is not increased more than necessary, the awkward feeling of physical disorder is not generated when driving, and the driving performance can be enhanced.

As is shown in FIG. 5, the control signal duty rate (%) of the deceleration control system 16 is decided in such a manner as to be in correspondence with the reductive change rate $\Delta Ne/Time$ of the engine speed, and the deceleration control system 16 is actuated by the control portion 18 in order to increase the air intake rate. As a result, the air intake rate is properly increased so that lowering of the engine speed and the occurrence of engine stall can be prevented.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an air intaking rate control device of an internal combustion engine for controlling an air intaking rate in such a manner as to control the engine speed so that it corresponds to the temperature of the cooling water of the engine and to actuate a deceleration control system for bypassing an intake throttle valve and feeding bypass air directly into said internal combustion engine upon actuation of an idle switch at deceleration, the improvement wherein said air intaking rate control device includes control means for actuating said deceleration control system only when (1) said temperature of cooling water of said engine is equal to or higher than a preset water temperature, (2) an accelerator switch is in its inactive state and the engine is decelerating, (3) said engine speed is equal to or lower than an actuation speed of said deceleration control system, and (4) a reductive change rate of engine speed is equal to or larger than an actuation differential change rate of said deceleration control system, and said control means including means for deciding a duty rate of a control signal applied to said deceleration control system such that said duty rate corresponds to said reductive change rate of engine speed and increases the rate at which bypass air is taken into the engine.

2. A method for controlling the air intake rate of an internal combustion engine, said internal combustion engine including a deceleration control system for bypassing an intake throttle valve thereof and feeding bypass air directly into said engine, comprising the steps of:

determining that the cooling water temperature of said engine is greater than or equal to a predetermined water temperature;

determining that said engine is decelerating;

determining that the engine speed is less than or equal to an actuation speed associated with said deceleration control system;

determining that the engine speed is changing at a reductive change rate which is greater than or equal to an actuation differential change rate associated with said deceleration control system; and thereafter, and only after said aforementioned four steps have been executed, applying to said deceleration control system a control signal which has a duty ratio corresponding to the reductive change rate of the engine speed and which increases the rate at which bypass air is taken into the engine.

* * * * *